US010584679B2

(12) United States Patent
Engelken et al.

(10) Patent No.: US 10,584,679 B2
(45) Date of Patent: Mar. 10, 2020

(54) METHOD FOR OPERATING A WIND TURBINE

(71) Applicant: Wobben Properties GmbH, Aurich (DE)

(72) Inventors: Sönke Engelken, Bremen (DE); Nikolay Mihov, Aurich (DE); Angelo Mendonca, Wilhelmshaven (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/572,056

(22) PCT Filed: Apr. 20, 2016

(86) PCT No.: PCT/EP2016/058752
§ 371 (c)(1),
(2) Date: Nov. 6, 2017

(87) PCT Pub. No.: WO2016/177578
PCT Pub. Date: Nov. 10, 2016

(65) Prior Publication Data
US 2018/0291877 A1    Oct. 11, 2018

(30) Foreign Application Priority Data
May 7, 2015   (DE) .................. 10 2015 208 554

(51) Int. Cl.
*G06F 19/00*   (2018.01)
*F03D 7/02*    (2006.01)
(Continued)

(52) U.S. Cl.
CPC .......... *F03D 7/0272* (2013.01); *F03D 7/0276* (2013.01); *F03D 9/11* (2016.05);
(Continued)

(58) Field of Classification Search
CPC .. F03D 7/0272; F03D 9/11; F05B 2219/2619; F05B 2270/101;
(Continued)

(56) References Cited

U.S. PATENT DOCUMENTS

| | | | |
|---|---|---|---|
| 5,155,375 A | 10/1992 | Holley | |
| 7,180,202 B2* | 2/2007 | Wobben | F03D 7/0284 |
| | | | 290/44 |

(Continued)

FOREIGN PATENT DOCUMENTS

| | | |
|---|---|---|
| AU | 2014200885 A1 | 3/2014 |
| DE | 112005000681 T5 | 4/2007 |

(Continued)

OTHER PUBLICATIONS

Asmine et al., "Field measurements for the assessment of inertial response for wind power plants based on Hydro-Québec TransÉnergie requirements," *IET Renewable Power Generation* 10(1):25-32, 2016.

(Continued)

*Primary Examiner* — Kidest Bahta
(74) *Attorney, Agent, or Firm* — Seed IP Law Group LLP

(57) ABSTRACT

A method for operating a wind turbine (WEA), which has a generator for supplying electric power to an electric supply grid, is provided. After being operated in a first operating state with a first power output and a first rotational speed, the wind turbine is set to a second operating state with a second power output and a second rotational speed. In order to set the wind turbine to the second operating state, an aerodynamic power output which is available for supply is determined, a target rotational speed is determined from the available output, and a target output to be set for the generator is specified from the target rotational speed.

12 Claims, 5 Drawing Sheets

(51) Int. Cl.
*F03D 9/11* (2016.01)
*F03D 9/25* (2016.01)
*G05B 19/042* (2006.01)

(52) U.S. Cl.
CPC ........... *F03D 9/255* (2017.02); *G05B 19/042* (2013.01); *F05B 2220/706* (2013.01); *F05B 2270/101* (2013.01); *F05B 2270/1012* (2013.01); *F05B 2270/1033* (2013.01); *F05B 2270/327* (2013.01); *F05B 2270/335* (2013.01); *G05B 2219/2619* (2013.01); *Y02E 10/723* (2013.01); *Y02E 10/725* (2013.01)

(58) Field of Classification Search
CPC ...... F05B 2270/1012; F05B 2270/1033; F05B 2270/0327; F05B 2270/335; G05B 19/042; G05B 2219/2619; Y02E 10/723; Y02E 10/725
See application file for complete search history.

(56) References Cited

U.S. PATENT DOCUMENTS

| | | | |
|---|---|---|---|
| 7,345,443 | B2 | 3/2008 | Yoshiura et al. |
| 7,839,008 | B2 * | 11/2010 | Woldmann ................ H02J 3/18 |
| | | | 290/44 |
| 9,279,411 | B2 | 3/2016 | Beekmann et al. |
| 9,506,454 | B2 | 11/2016 | Krueger et al. |
| 9,509,141 | B2 * | 11/2016 | Egedal ..................... F03D 7/026 |
| 2005/0225090 | A1 * | 10/2005 | Wobben .................... F03D 9/00 |
| | | | 290/44 |
| 2006/0163881 | A1 * | 7/2006 | Bucker .................... H02P 9/007 |
| | | | 290/44 |
| 2007/0052244 | A1 * | 3/2007 | Hudson ................. F03D 7/0272 |
| | | | 290/44 |

FOREIGN PATENT DOCUMENTS

| | | |
|---|---|---|
| DE | 102009014012 A1 | 9/2010 |
| DE | 102010014165 A1 | 10/2011 |
| EP | 2775139 A1 | 9/2014 |
| WO | 2011124696 A2 | 10/2011 |

OTHER PUBLICATIONS

Fischer et al., "Operational experiences with inertial response provided by type 4 wind turbines," *IET Renewable Power Generation* 10(1):17-24, 2016.

Verrelli et al., "On-Line Identification of Winding Resistances and Load Torque in Induction Machines," *IEEE Transactions on Control Systems Technology* 22(4):1629-1637, Jul. 2014.

* cited by examiner

METHOD FOR OPERATING A WIND TURBINE

BACKGROUND

Technical Field

The present invention relates to a method for operating a wind power installation. The present invention furthermore relates to a wind power installation. The present invention furthermore relates to a state observer for observing an available power of a wind power installation.

Description of the Related Art

Wind power installations and methods for operating them are known. Wind power installations feed electrical power into an electrical supply network, and are also being used increasingly to support the electrical supply network electrotechnically, where appropriate.

One possibility of such support is that, after a frequency dip, the wind power installation can temporarily feed a higher power into the electrical supply network, which may for simplicity also be referred to merely as the network, which is higher than the wind power installation can generate on the basis of the prevailing wind conditions at that time. Specifically, in addition to the power which is generated from the wind, electrical power from the kinetic energy of the rotor is also used therefor. This involves, in particular, the aerodynamic rotor of the wind power installation as well as an electromagnetic rotor, coupled thereto, of the generator. This applies in particular for gearless wind power installations in which the rotor of the generator is coupled directly to the aerodynamic rotor and the rotor also has a significant moment of inertia. This kinetic energy of the rotor affects all these rotating parts.

In any event, the feeding of this kinetic energy leads to the speed of the rotor being reduced. After this supporting measure is over, or can be ended, the wind power installation should return to its normal operating state. In simple terms, for the assumption of constant wind speed over the period of time considered, this means that the rotational speed must be increased again, and the electrical power of the generator must to this end necessarily lie below the driving power generated by the aerodynamic rotor for a certain period of time, and can therefore only be increased again slowly.

Such a rotational speed increase, i.e., returning the installation to the normal operating state, may however entail problems. Firstly, there is always the risk that the wind power installation, in this low rotational speed operating state which has occurred unavoidably, may also be in an aerodynamically less effective operating state. The installation must correspondingly be operated carefully in this state, which also applies for returning to the normal operating state. Furthermore, the reduction of the electrical power for the purpose of reacceleration may under certain circumstances have detrimental effects on the network, which after the previous disturbance still relies on a maximally constant and high power input from the wind power installation.

In the priority application for the present application, the German Patent and Trademark Office has searched the following prior art documents: DE 10 2009 014 012 A1, DE 11 2005 000 681 T5 and WO 2011/124696 A2.

BRIEF SUMMARY

An advantageous way of returning a wind power installation as favorably as possible into the normal operating state after such a rotational speed reduction, due to network support by feeding in increased power, is intended to be presented. At least, an alternative solution to the hitherto known solutions is intended to be provided.

A method for operating a wind power installation, which is conventionally also abbreviated to WPI, comprising a generator is provided. Advantageously, with this method, electrical power is fed into an electrical supply network. Now, the situation is taken into account in which, after a first operating state with a first power output and a first rotational speed, a change is intended to be made to a second operating state with a second power output and a second rotational speed. The method in this case relates in particular to the situation in which the first operating state is an operating state of increased power output, and the intention is to return therefrom in a controlled way into a normal operating state. The normal operating state in this case constitutes the second operating state. This operating state of increased power output is one in which the wind power installation has temporarily output more power than it was able to generate on the basis of the prevailing wind conditions. The wind power installation has therefore also output stored power as a supplement in addition to the power generated from the wind. This has been taken from the kinetic energy of the rotation of the rotor of the wind power installation and the rotor of the generator, so that the rotational speed has then become lower.

From this operating state of increased power output, which specifically has then ended or is then ended, the intention is to return to the normal operating state. This normal operating state is intended to mean the one in which the amount of power fed into the electrical network is that which the wind power installation can generate from the wind on the basis of the prevailing wind conditions. This relates essentially to feeding into the electrical supply network the power, or amount of power, which the wind power installation has been able to draw from the wind, less power used in another way therefrom. This power used in another way relates, when using an externally excited synchronous machine, particularly also to the provision of the corresponding excitation current. Other or further power outputs may, however, also be envisaged.

In any event, the wind power installation is intended to be returned in a controlled way from this operating state of increased power output, and therefore reduced rotational speed, into this normal operating state with the power output matched to the wind and a rotational speed matched thereto. In this case, the power regularly also decreases strongly after or at the end of this operating state of increased power.

To this end, it is proposed initially to determine an aerodynamic power available for the feed. This available aerodynamic power is one which is initially based on the aerodynamic power that can be drawn from the wind, but is reduced by power that is needed in another way before being fed in. For simplicity, this will be referred to below as the available power. From this available power, i.e., the power determined as available power, a setpoint rotational speed is then determined. Thus, the last rotational speed before this supporting measure, i.e., the rotational speed which there was shortly before the wind power installation fed in an increased power, is not simply used, but rather it is determined as a function of this available power.

Once this setpoint rotational speed has been determined, a setpoint power to be adjusted at the generator is specified as a function thereof. The installation can then control the installation on the basis of the setpoint power. This setpoint power, which may in this case be regularly tracked, thus specifies the regulating objective which ultimately leads to this normal operating state.

Thus, by taking into account the actual situation on site, controlled return into the normal operating state can now be carried out. In this case, it should also be noted that the available aerodynamic power at the respective instant depends not exclusively on the prevailing wind conditions, but also on the existing rotational speed of the wind power installation, which is detected and taken into account. In particular, it may be that, owing to the reduced rotational speed, there is a lower tip-speed ratio, which is in turn not optimal and therefore not as much power can be drawn from the wind as would be the case at that instant with an optimal tip-speed ratio. This is also taken into account by the proposed method.

However, in particular the controlled change, especially controlled return, from a first operating state into the second operating state may be envisioned, in which the first does not have the optimal power output or the optimal rotational speed for other reasons. In this case, the second operating state may also have a higher rotational speed than the first. A controlled change is then made from a higher rotational speed to a lower rotational speed.

The first and second rotational speeds and the first and second power outputs are in principle different, although the case may arise that the first and second power outputs are equal.

According to one embodiment, it is proposed that the available power is determined from a rotational speed of the generator and the power fed into an intermediate electrical storage unit, in particular a DC voltage intermediate circuit. In this way it is also possible, for the available power, to take into account the rotational speed of the generator and to use information from this intermediate storage unit.

Preferably, a wind power installation is based on a so-called full installation concept. In this case, all power generated by the generator is rectified and put into the DC voltage intermediate circuit, which then forms the intermediate electrical storage unit. Then, by means of a power inverter, feed into the electrical supply network is carried out from this DC voltage intermediate circuit. To this extent, the power fed into the DC voltage intermediate circuit, or another intermediate storage unit, can give information about the available power. In this case, it has been discovered that information about the available aerodynamic power can be derived by jointly taking the rotational speed of the generator and this power in the intermediate storage unit into account.

According to one embodiment, it is proposed that the available power is determined by a state observer. In this way, by a system or subsystem established in the observer, even a not directly measurable variable can be recorded. A poorly measurable variable, the measurement of which is, for example, inaccurate or affected by noise, may also be recorded better by the observer.

Preferably, the state observer has the rotational speed of the generator and the mechanical torque of the generator as state variables to be observed. The rotational speed of the generator may conventionally be recorded by measurement technology, and is often also available as a measured variable. By taking it into account as a state variable in the state observer, however, it is possible to improve the measurement quality. In particular, the measurement quality can be adapted in terms of accuracy and dynamic response to the requirements for the intended recording of the available power. This is possible in particular by parameterization of the observer, in particular by the parameter $k_\omega$, which will also be explained below.

Taking into account the mechanical torque of the generator as a state variable in the state observer has, in particular, the advantage that this variable is not, or not readily, recordable by measurement technology but at the same time is highly suitable for determining the available power. By virtue of such a state observer, the rotational speed of the generator and the mechanical torque of the generator are therefore available as variables that can be used directly for the further determination. The state observer may determine these variables, and make them available, at each sampling step and therefore also in an online implementation.

Preferably, the state observer is defined by the following structure, which is given here as follows as a system description in matrix representation:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

in which
J denotes the combined moment of inertia of the rotor and generator,
ω is the rotational speed of the generator,
$k_\omega$ and $k_T$ are parameters for influencing the dynamic response of the observer,
$T_{el}$ is referred to as an electrical torque and is calculated as the ratio of the power $P_{DC}$ fed into a (or the) intermediate electrical storage unit and the rotational speed ω, and
$T_{mech}$ denotes the mechanical torque of the rotor and the generator, wherein the observed variables are marked with a ^ symbol and the available power to be determined is calculated as the product of the observed rotational speed $\hat{\omega}$ and the observed mechanical torque $\hat{T}_{mech}$.

J therefore denotes the combined moment of inertia of the rotor and the generator, which to this extent implies a gearless wind power installation in which the rotor of the generator is mechanically coupled directly to the aerodynamic rotor. Ultimately, this moment of inertia naturally involves everything which is coupled firmly to the rotor and the rotor of the generator and rotates together. However, all such elements, for example the rotor hub, could also be part of the rotor. In principle, however, in the case of a geared wind power installation, the part of the moment of inertia of the generator could be calculated into this total moment of inertia by means of a corresponding transmission ratio.

The rotational speed ω of the generator is in this gearless concept correspondingly at the same time the rotational speed of the rotor firmly connected thereto. The parameters $k_\omega$ and $k_T$ are parameters for influencing the dynamic response of the observer, and their effect is given by the understanding of the formula indicated. In particular, the parameter $k_\omega$ influences tracking of the observed rotational speed $\hat{\omega}$ as a function of the difference between that observed $\hat{\omega}$ and that measured ω. The same difference is influenced by means of the parameter $k_T$ for the tracking of the mechanical torque $\hat{T}_{mech}$.

With this state observer, these two states, namely the rotational speed ω and the mechanical torque $T_{mech}$ can therefore also be determined by a comparatively simple structure.

The electrical torque $T_{el}$ is calculated here as a ratio of electrical power fed into the intermediate storage unit and the rotational speed ω. The following equation thus applies:

$$T_{el} = \frac{P_{DC}}{\omega}$$

The rotational speed ω is measurable, although in this case the observed rotational speed $\hat{\omega}$ of the state observer may also be used. The power $P_{DC}$ fed into the intermediate storage unit, in particular the DC voltage intermediate circuit, can be recorded or measured, and is generally known in the full installation, or the associated or contained control, and exists as a variable there.

The available power to be determined can now simply be calculated as a product of this observed rotational speed $\hat{\omega}$ and the observed mechanical torque $\hat{T}_{mech}$. This represents the aerodynamic power available for feeding in at the relevant instant. This available power then forms the starting point from which a setpoint rotational speed, and from this a setpoint power to be set at the generator, is specified, as already explained above with the aid of some embodiments.

The state observer thus also determines the available power in real time, and a setpoint power to be set at the generator, which differs from this available power, is only determined therefrom.

According to one embodiment, the setpoint rotational speed may be determined as a function of a rotational speed/power characteristic curve. Such a rotational speed/power characteristic curve therefore indicates a predefined relationship between rotational speed and power, and is used so that an associated power value can be selected for an existing rotational speed, or a desired rotational speed. This may be based on a normal rotational speed/power characteristic curve which is conventionally used in the wind power installation control, or a special rotational speed/power characteristic curve may be used as a basis for this application.

According to another embodiment, the use of a regulator is provided so that the setpoint power is determined from the available power and the actual rotational speed of the generator.

Preferably, to this end a difference between the setpoint rotational speed and the actual rotational speed is initially formed. The actual rotational speed observed by the state observer may in this case be used as the actual rotational speed. This difference of the rotational speed, i.e., of the generator rotational speed, may also be referred to here as a system deviation.

From this difference of the setpoint and actual rotational speeds, a differential torque, which determines the difference between the observed mechanical torque and the electrical torque, is determined by means of a regulating algorithm. In the simplest case, this may be carried out by means of a P regulator, but preferably by means of a PI regulator or by means of a PID regulator.

To this differential torque determined in this way, which to this extent also initially represents an internal regulatory variable, the observed mechanical torque is added and this sum forms a setpoint torque.

The setpoint torque may also be delivered to the control of the wind power installation, the setpoint power being calculated before or even in the control of the wind power installation from the setpoint torque by multiplication by the actual rotational speed. Here again, the actual rotational speed observed in the state observer, or the measured one, may be used for the actual rotational speed.

The control or regulation provided in any event in the wind power installation then implements this setpoint power so that the wind power installation operates at an operating point which is intended to have this setpoint power as an actual power immediately, or tracks the operating point to this setpoint power, which is also varied. Correspondingly, a new actual rotational speed is also set up, which is used further by this regulator as explained herein.

With the aid of this embodiment, a basic concept will be explained again by way of example. After a network support, the wind power installation is in an operating state with reduced rotational speed. The power delivered was previously increased and must now decrease rapidly in order to achieve reacceleration. The wind power installation should now be returned as much as possible into a normal operating state, and a particularly advantageous, in particular expediently controlled return into this normal operating state is proposed herein. As a basis for this controlled return, the available power is determined, which may be carried out particularly favorably by means of a state observer. On the basis of this determined available power, a setpoint power to be set up is determined, in particular by means of a dynamic process, and delivered to the installation control as a specification value. This setpoint power is generally itself also dynamic, and the installation should ultimately be returned to this normal operating point while varying in this case, so that the output values for this proposed return also vary.

In particular, the installation actually coming to a standstill because of an uncontrolled return, or an uncontrolled attempt at a return, is also prevented in this case. This could, for example, happen when a power is demanded which is too great for the wind power installation to draw from the wind at that instant and in its current operating state, and could therefore be braked further, which would further exacerbate the situation until in the extreme case the installation comes to a stop.

A preferred aim is also that the power does not initially decrease too greatly, since this could again lead to a case of disruption in the network.

This method is therefore particularly useful for an operating state in which the wind power installation has reduced its rotational speed, and subsequently also its power, because of a previously elevated power output. In principle, however, this method may also be envisaged when the installation is in an operating state of lower rotational speed because of other circumstances, for example other specifications of the network operator or statutory regulations. That is to say, it is in a state in which the rotational speed is less than would be conventional or normal under the prevailing wind conditions.

A further application is continuous operation, i.e., operation of a wind power installation with rotational speed regulation in order to achieve an optimal working point for the respective current wind speed.

A state observer which can determine an available power is provided. In particular, this state observer operates as explained above in connection with the embodiments for the operation of a wind power installation. It has now been discovered that such a state observer for determining the available power, i.e., for determining an aerodynamic power available for feeding in, is also advantageous when this available power is not, or not only, used for returning the wind power installation to a normal operating state in a controlled way. Correspondingly, the comments which have been or will be made above or below in a different context regarding the state observer also apply accordingly herein.

Provided is a wind power installation which can be returned in a controlled way from a first operating state into a second operating state, particularly into a normal operating state, by a method according to one of the embodiments described above, which in addition or as an alternative comprises a state observer according to at least one of the embodiments described above for determining an available power.

Preferably, the wind power installation comprises a return control unit, in which the method for returning to the normal operating state is implemented and can be carried out. The return control unit can therefore change in a controlled way from a first operating state to a second operating state. Such a return control unit is preferably linked to an operational control unit of the wind power installation, or may form a part thereof.

In addition or as an alternative, it is proposed to provide an observer control unit which comprises the state observer for determining the available power, so that the state observer is implemented therein and can be operated therein. The observer control unit may also be part of the return control unit, or may be configured separately, in particular when the state observer is intended to be operated without the method for returning to the normal operating state. Preferably, the observer control unit is connected to the operational control unit of the wind power installation, or may form a part thereof.

BRIEF DESCRIPTION OF THE SEVERAL VIEWS OF THE DRAWINGS

The invention will be explained in more detail below by way of example with the aid of exemplary embodiments with reference to the appended figures.

DETAILED DESCRIPTION

Figure 1:
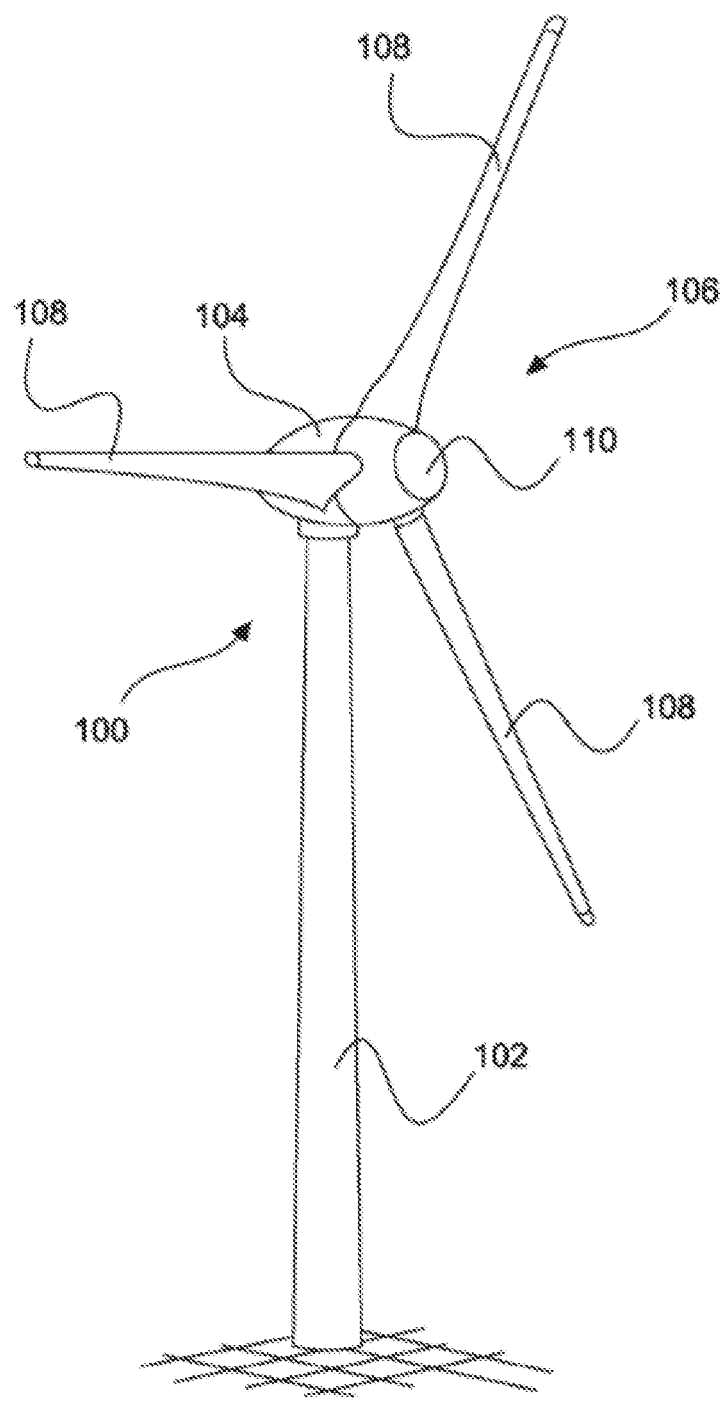
FIG. 1 shows a wind power installation in a perspective representation.

FIG. 1 shows a wind power installation 100 having a tower 102 and a nacelle 104. A rotor 106 having three rotor blades 108 and a spinner 110 is arranged on the nacelle 104. During operation, the rotor 106 is set in a rotational movement by the wind and thereby drives a generator in the nacelle 104.

Figure 2:
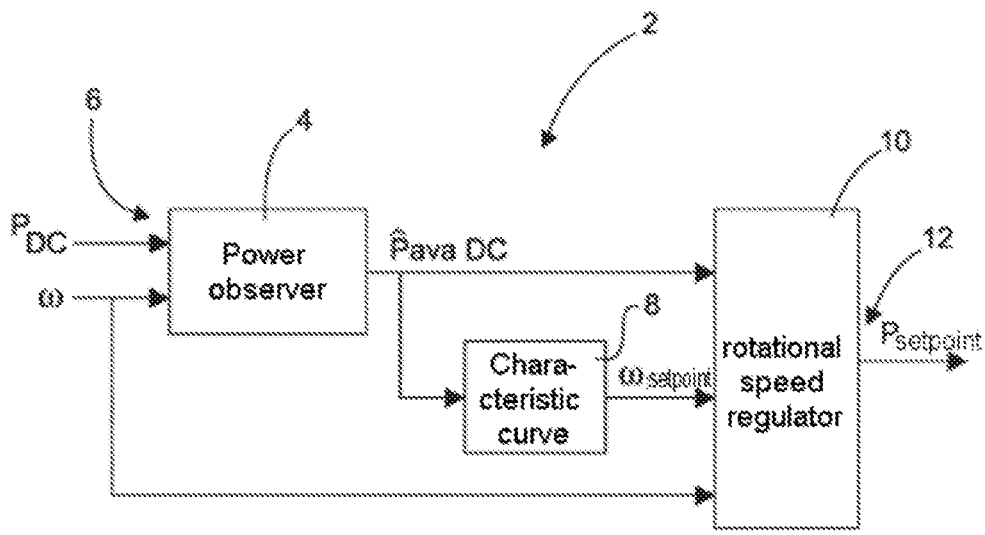
FIG. 2 shows a structure for specifying the setpoint power to illustrate a proposed method.

FIG. 2 shows a block diagram 2 for the specification of a setpoint power $P_{setpoint}$, which is intended to be provided to the wind power installation as a power setpoint value in order to return the wind power installation to a normal operating point on the basis thereof. Block diagram 2 schematically shows the sequence in an overview.

As input variables, a power $P_{DC}$ fed into a DC electrical voltage intermediate circuit and the rotational speed ω of the generator are fed into the power observer 4 at its input 6.

This power observer 4 is a state observer, which can have the rotational speed of the generator and the mechanical torque of the generator as observed state variables. As a result, the available power $\hat{P}_{avaDC}$ is obtained, which is also referred to as the aerodynamic power available to be fed in. The index of this observed power $\hat{P}_{avaDC}$ also indicates that it relates to the DC voltage intermediate circuit. Specifically, this power is that which, although it depends on the prevailing wind speed and also on the current operating state of the wind power installation, i.e., it depends on how much power can be drawn from the wind, nevertheless also already takes into account that a part of this power that can be drawn from the wind is being used in another way, in particular for excitation of the generator or for covering the losses during the energy conversion in the generator. This available power $\hat{P}_{avaDC}$ therefore describes a power which is actually available and could be fed into the electrical supply network by the power inverter.

To this extent, although this available power is that which is available at the intermediate circuit, it nevertheless differs from the power fed into the intermediate circuit in that it is continuously available because of continuous replenishment from the wind and would not lead to a change in the rotational speed of the wind power installation.

From this available power $\hat{P}_{avaDC}$, a setpoint rotational speed $\omega_{setpoint}$ is then determined in a characteristic curve block 8 in which a rotational speed/power characteristic curve is stored. This setpoint rotational speed is an input variable for the rotational speed regulator in the rotational speed regulator block 10, which will be explained further in FIG. 3.

The available power $\hat{P}_{avaDC}$ is likewise an input variable for the rotational speed regulator in block 10, and the rotational speed is also a further input variable for this rotational speed regulator in the rotational speed regulator block 10. In this case, the measured rotational speed or the rotational speed present as an estimated state variable in the power observer 4 may be used.

The rotational speed regulator in block 10 then generates the setpoint power for the wind power installation at its regulator output 12 in a dynamic process.

Figure 3:
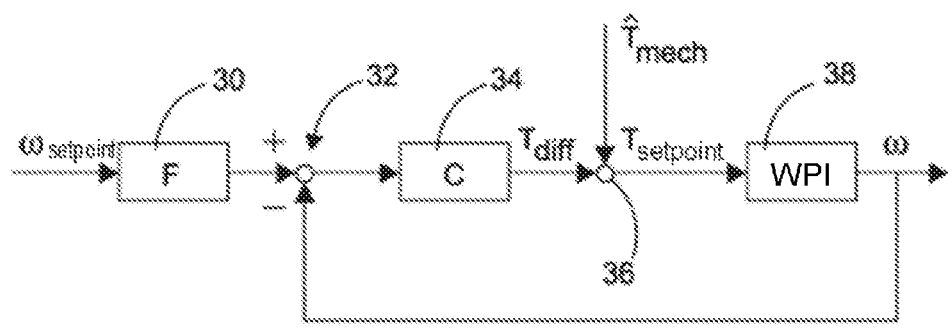
FIG. 3 illustrates a rotational speed regulating structure in a block diagram.

FIG. 3 illustrates a rotational speed regulator in the sense of the rotational speed regulator block 10. Correspondingly, the setpoint rotational speed $\omega_{setpoint}$, the actual rotational speed ω and, indirectly, the available power are also taken into account here as input variables. The available power is not indicated in FIG. 3, but the available mechanical torque $\hat{T}_{mech}$ is related thereto and indirectly forms a corresponding input variable.

The setpoint rotational speed may initially be fed through a digital filter 30, which may for example be a first-order low-pass filter. A regulator structure with two degrees of freedom can be formed in this way, which allows an improvement of the robustness of the regulating loop in relation to modelling inaccuracies of the regulating path for consistently good setpoint value tracking performance. The converse case, i.e., that there is good robustness with good modelling accuracy but not so good setpoint value performance, should also be mentioned here.

A difference between the setpoint and actual values of the rotational speed is then formed in the difference block 32. This difference is sent to the regulating block 34, which determines the corresponding differential torque therefrom by means of a regulating algorithm. The regulating algorithm may, in particular, comprise a P structure, a PI structure or a PID structure.

The differential torque determined in this way is added to the observed mechanical torque $\hat{T}_{mech}$ at the adder component 36 so that a setpoint torque is obtained as $T_{setpoint}$, which can be transmitted as an input variable and specified variable to the control of the wind power installation. This is represented by the wind power installation block 38. The calculation of the setpoint power $P_{setpoint}$ by multiplying the setpoint torque $T_{setpoint}$ by the rotational speed ω may also be carried out in the wind power installation block 38.

Correspondingly, the wind power installation is thus regulated in the wind power installation block 38, and the wind power installation per se is also contained therein and ultimately delivers as output the physical variable of its rotational speed, i.e., the rotational speed ω of the generator, which is fed back to the difference component 32. The difference component 32 may naturally also be referred to as an adder component 32 with negative input.

The field of application is concentrated on the use of wind power installations for network support in the event of frequency dips, for example in the event of power station outages. The power observer may in this context also be used as a basis for various other regulating algorithms for a wind power installation, for example for reserved power regulation or optimized regulation of the working point during normal operation of the wind power installation.

The conduct of a network support by power increase is made even more compatible than before, and in particular the reduction of the effective power after the end of the power increase is kept as small as possible. In this way, a further disruption of the energy system power balance is restricted to a minimum amount.

Figure 4:
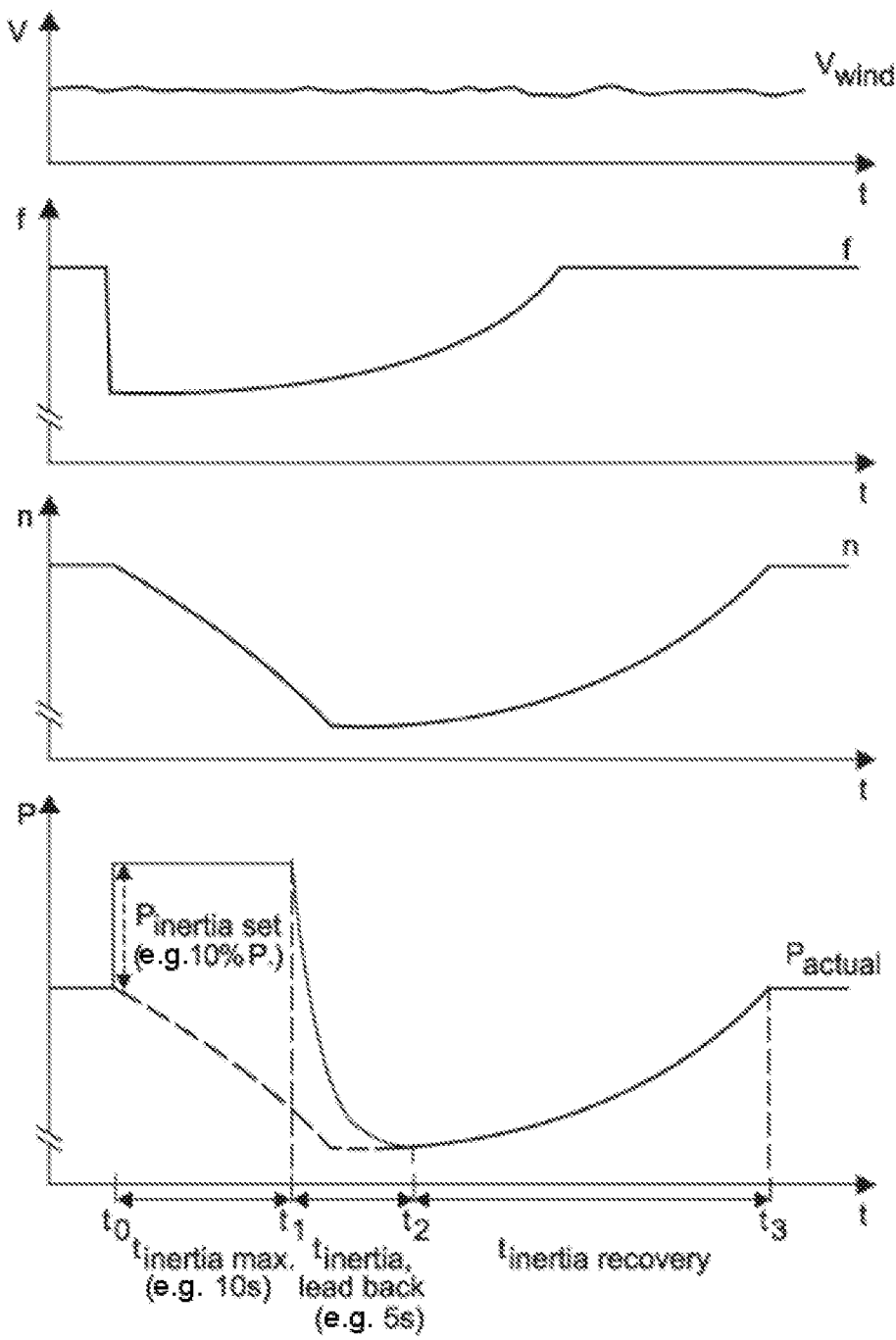
FIG. 4 shows a plurality of diagrams illustrating a process of a frequency dip with the sequence and effect of support by a wind power installation.

A return to an optimal working point after the end of a power increase is schematically represented in FIG. 4, which shows a typical behavior.

FIG. 4 represents as a function of time t the wind speed v, the network frequency f, the rotational speed n, which may also be denoted as ω, and the power P fed in. At time $t_0$, the frequency dip occurs, or is detected. The frequency f therefore dips, the power P is set far above the previous value, and kinetic energy is used for this, with the result that the rotational speed n decreases slowly. It is assumed that the wind speed is essentially constant over the entire period of time studied.

The network support by the increased power input ends at the time $t_1$, at which the power P then falls slowly, namely greatly below the previous value and therefore also greatly below the amount possible because of the existing wind speed.

At time $t_2$, the power then gradually increases again. The rotational speed n then increases again gradually as well.

At time $t_3$, the conditions have been normalized again and the operating point is a normal operating point, with a power P fed in and a rotational speed n as before the frequency dip. In the example, however, the frequency f has already recovered significantly earlier.

As represented in FIG. 4, the power setpoint value of the wind power installation (WPI) is therefore reduced after the end of the adjusted power increase duration over the period of time $t_{inertia, lead, back}$. After the end of this period of time, i.e., for instance at the time $t_2$, the power setpoint value is at the value which is assigned to the current rotational speed according to a firmly preadjusted rotational speed/power characteristic curve. Since, however, the rotational speed is too low relative to an optimal value for the current wind conditions because of the braking effect of the previous power increase, this power setpoint value does not correspond to the aerodynamic power currently being caused by the wind. Instead, the power setpoint value often lies significantly below the effective power level delivered before the initiation of the network support, to which References [1, 2] also relate. Because of the great reduction of the effective power, the wind power installation (WPI) accelerates within a few seconds back to a higher rotational speed and returns to a normal operating behavior. From the point of view of the energy system, however, such a great reduction of the effective power output is to be evaluated as a new disruption, and is therefore to be reduced as far as possible; Reference [1] also relates to this.

Figure 5:
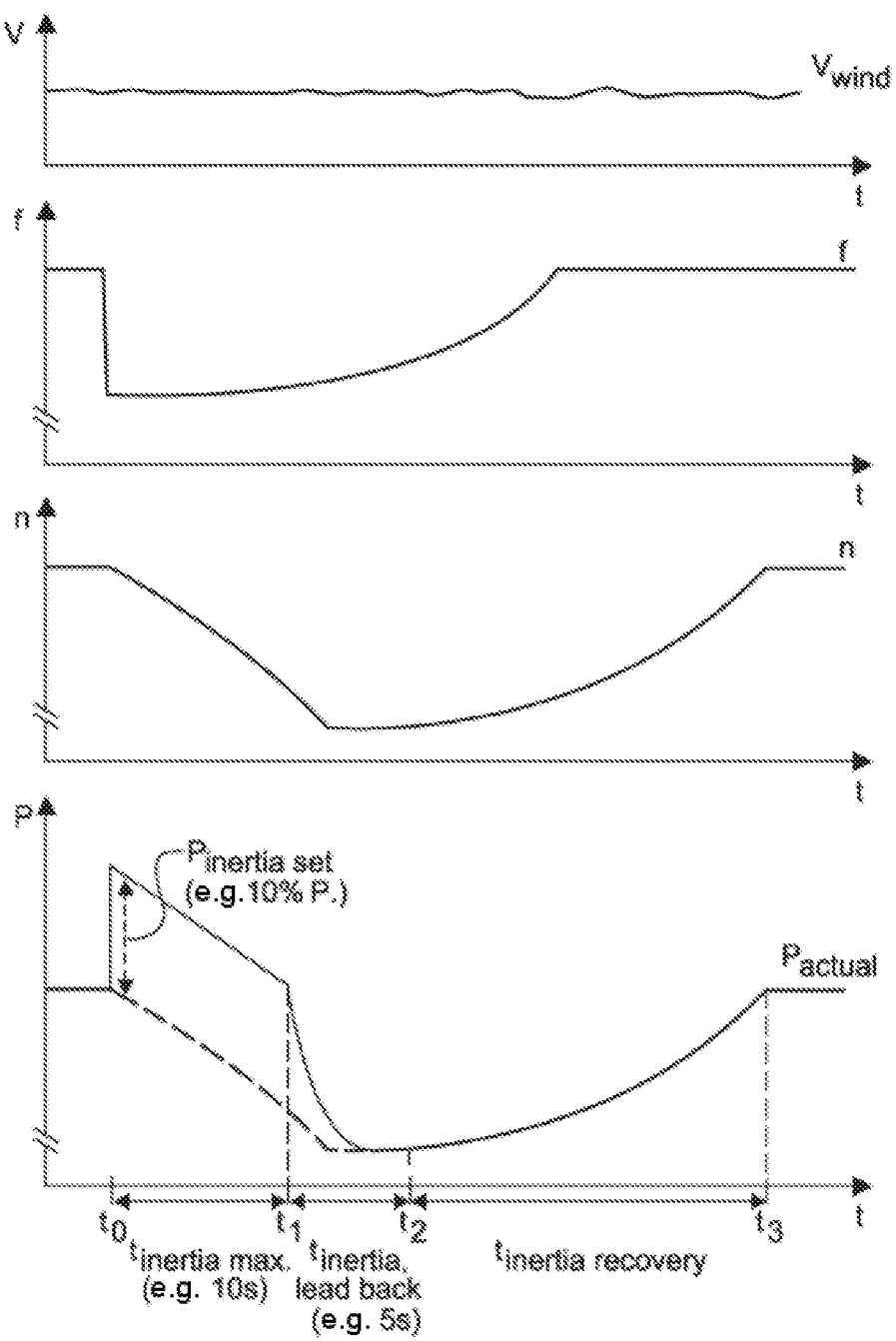
FIG. 5 shows, in a similar way to FIG. 4, diagrams to illustrate the sequence of a frequency dip together with support by a wind power installation, in which in contrast to FIG. 4 a variable setpoint value can be adjusted for the supporting power.

A power increase with a variable setpoint value is represented in FIG. 5.

The profiles and conditions of FIG. 5 correspond to those of FIG. 4, and reference is therefore made to FIG. 4 for explanations. The essential difference of the behavior according to FIG. 5 is that in the case of the frequency dip at $t_0$, the power fed in is initially increased very gradually to a starting power, but the starting power is not maintained but lies approximately by a constant differential value above a fictitious power assigned to the decreasing rotational speed n. This fictitious power is indicated in FIG. 5, as well as in FIG. 4, respectively by dashes in the lower diagram.

As a result, however, the power dip behaves here very similarly as explained with reference to FIG. 4.

One published method is that which is referred to as "Dynamic Inertia Regulation" by Repower Systems according to Reference [3]. In this method, control of the return of the wind power installation (WPI) from a working point with a reduced rotational speed to an optimal working point, which may also be referred to as a normal working point, is carried out by the specification of a setpoint rotational speed gradient, or a gradient corridor defined by minimum and maximum gradients. This accordingly leads to a constant difference between the aerodynamic and electrical torques during the period of the return. One disadvantage of this method is the use of a rotational speed gradient in the context of the regulating method. This requires a high-quality measurement of the rotational speed signal, so that a numerical derivation is not unsuitable because of an excessively high noise level for the regulation.

Otherwise, strong filtering of the rotational speed signal or, similarly to the method, the use of a state observer for the rotational speed and/or its derivation, could be a solution. This, however, is not described in Reference [3].

Figure 6:
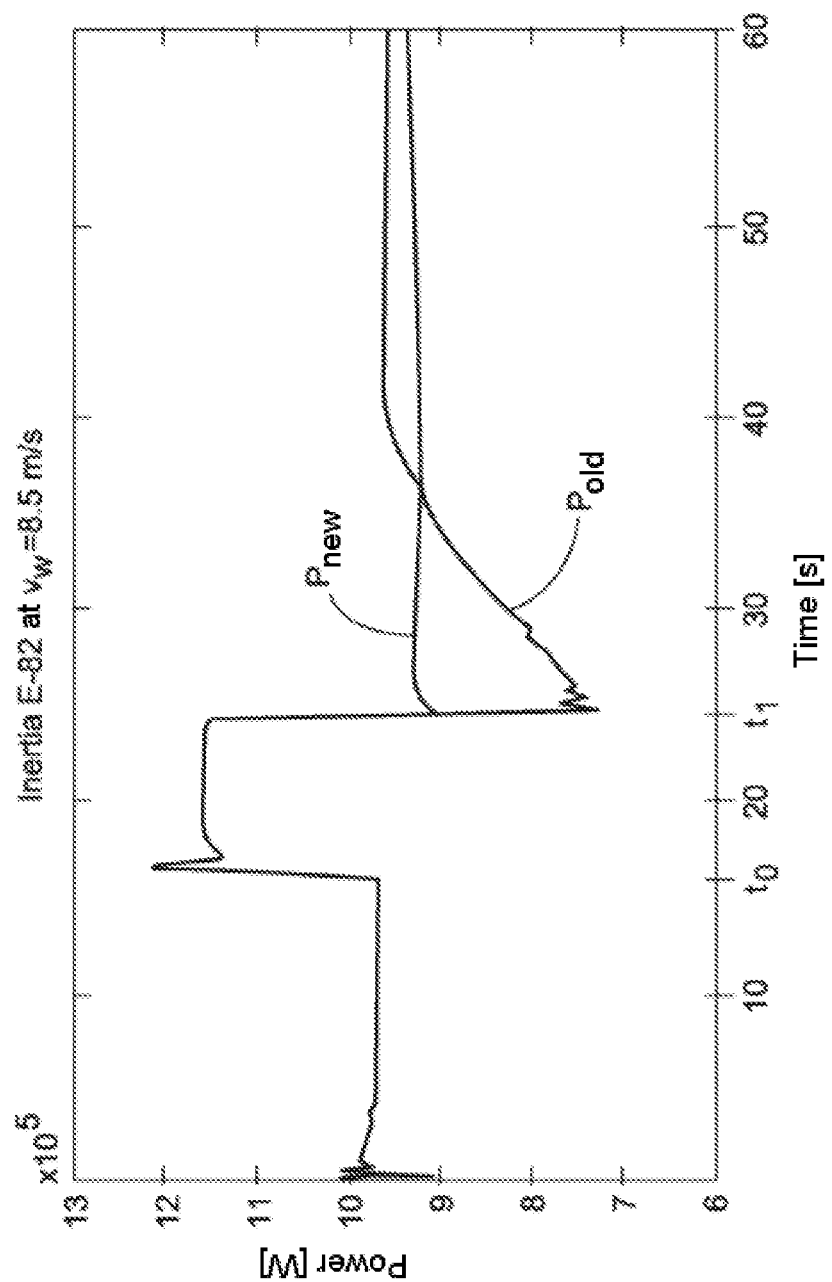
FIG. 6 shows simulated power profiles for the return of the power to the normal power and therefore to the normal operating point according to one embodiment and in comparison with another embodiment.

FIG. 6 shows a comparison of the simulated power profiles for a known method $P_{old}$ and for a method proposed herein $P_{new}$, which is parameterized for a return duration of about 60 s with a wind speed $v_w$=8.5 m/s. It can be seen that the power $P_{new}$ according to the method proposed decreases much less after the end of the power increase at $t_1$ than the power $P_{old}$ according to the comparative method.

Provided is a reduction in the power of the wind power installation (WPI) after the end of the power increase during the network support and controllability of the duration of the return to the optimal working point of the wind power installation (WPI).

A particular intention is to achieve controllability of the depth of the power dip after the end of the network supporting power increase phase by adjustability of a setpoint value filter in the regulating method, and, with suitable parameterization of the filter, i.e., the state observer, significant reduction of the power dip compared with previously known methods and therefore a reduction of destruction of the power balance nonequilibrium in the energy system in question.

Referring to the embodiments and results explained in detail, but also in a way which may be generalized, the following will also be added for explanation.

Provided is a method for network support by wind power installations, which are abbreviated to WPI, in the event of a significant dip of the network frequency. The possibility of temporarily increasing the delivered effective power of a wind power installation in such a case is known, and will be referred to here as support.

The effective power increase in response to a network frequency dip may be carried out over an adjustable period of time and with a particular established increase relative to the effective power at the time when the support is initiated.

The consequence of an increased effective power output is typically a reduction of the rotational speed of the WPI compared with the moment before initiation of the support. This may be represented illustratively with the aid of the acceleration equation of a rotating one-mass system:

$$J\dot{\omega} = T_{mech} - T_{el} = \frac{1}{\omega}(P_{mech} - P_{el})$$

In this formula, J denotes the moment of inertia of the rotating masses of the WPI, $\omega$ denotes the rotational speed of the WPI, $T_{mech}$ and $P_{mech}$ respectively denote the torque and the power occurring on the shaft because of the wind, and $T_{el}/P_{el}$ denote the electromechanical torque, or the power, of the generator. If a generator power which exceeds the mechanical power is drawn over a period of time, braking of the WPI takes place.

This inequality of the power balance occurs with an approximately constant wind speed during a support event. The effect is further exacerbated because the aerodynamic efficiency of the WPI may deteriorate with a decreasing rotational speed and constant wind speed relative to an optimal working point before the start of the support function. An optimal working point is achieved with a particular tip-speed ratio, i.e., the ratio of the speed of revolution of the blade tip to the wind speed. The decrease of the tip-speed ratio during the initiation of support typically leads to a decreasing aerodynamic power with a constant wind speed. After the end of the power increase, the WPI is thus often at a suboptimal working point in terms of rotational speed and wind speed, i.e., the rotational speed is too low in relation to the wind speed, so that the tip-speed ratio is not optimal. The problem thus arises of subsequently reaccelerating the WPI in order to reach a higher rotational speed and, in association therewith, higher aerodynamic efficiency. To this end, various options may be selected:

A strong reduction of the effective power output after the end of the supporting power increase, which leads to a rapid acceleration of the WPI and therefore a rapid return to an optimal working point. Reference [2] relates to this.

A small reduction of the effective power output after the end of the supporting power increase, which leads to a slow acceleration or, in the event of too little reduction, even further braking of the WPI.

In terms of frequency stability in an energy system, the latter option is advantageous, which Reference [1] also relates to. A strong reduction of the effective power by a large number of WPIs in an energy system is equivalent to another disruption of the power balance of this energy system. Often, it is precisely such a disruption of the power balance, which is caused for example by a failure of a power station or a line, that was responsible for a frequency dip and therefore for the initiation of the support function. It is therefore appropriate to limit the power reduction to a minimum extent, so that the rotational speed of the WPI does not decrease further but can be increased in a controlled way and over a more prolonged period of time back to the optimal rotational speed.

Described herein is returning the WPI to an optimal operating point after the end of a supporting power increase with the least possible power reduction in relation to the effective power delivered by the initiation of support. To this end, a method which is graphically represented in FIG. 2 is provided.

For each measurement, the values of rotational speed ($\omega$) and power in the DC intermediate circuit ($P_{DC}$) are recorded. From these, with the aid of a state observer, an available aerodynamic power relating to the intermediate circuit ($\hat{P}_{avaDC}$) is calculated, i.e., it corresponds to the aerodynamic power less the generator losses. For this available power, a setpoint rotational speed ($\omega_{setpoint}$) is calculated by means of a characteristic curve. By using the calculated available power $\hat{P}_{avaDC}$, a power setpoint value is finally output by a rotational speed regulator. This is converted by the existing power regulating software of the WPI into a control signal for the electrically excited generator, which leads to the WPI reaching the setpoint rotational speed over a parameterizable period of time. The individual method components will now be described separately:

For the power observer and on the basis of Equation (1), the following state space model of the WPI can be set up, with the state variables rotational speed ($\omega$) and mechanical torque ($T_{mech}$):

$$\begin{bmatrix} \dot{\omega} \\ \dot{T}_{mec} \end{bmatrix} = \begin{bmatrix} 0 & \frac{1}{J} \\ 0 & 0 \end{bmatrix} \begin{bmatrix} \omega \\ T_{mech} \end{bmatrix} + \begin{bmatrix} -\frac{1}{J} \\ 0 \end{bmatrix} T_{el}$$

Of the variables used here, the mechanical torque $T_{mech}$ cannot be measured and therefore needs to be calculated from the measurement data by means of a state observer. Since the rotational speed signal is furthermore often measured only with a low resolution and with a low sampling rate, a state observation is also proposed for this value. A suitable observer structure may be formulated as follows, reference being made to Reference [4] for further explanation:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

Here, in contrast to the measured input variables of rotational speed $\omega$ and the electrical torque $$T_{el} = \frac{P_{DC}}{\omega},$$

observed variables are denoted by ^. The two parameters $k_\omega$ and $k_T$ influence the dynamic behavior and, with time-discrete implementation, also the stability of the state observer, and must be selected while taking these aspects into account.

The calculation of the aerodynamic power $\hat{P}_{avaDC}$ is carried out by means of the product of rotational speed and torque.

Regarding the characteristic curve, it should be explained that this component assigns a setpoint rotational speed $\omega_{setpoint}$ to each calculated available power $\hat{P}_{avaDC}$, for example by means of a static characteristic curve.

The rotational speed regulator must achieve a return of the WPI to the calculated setpoint rotational speed while taking into account an effective power reduction which is as small as possible. Its structure is represented in FIG. 3 in the form of a simplified block diagram. The rotational speed error is calculated, and a differential torque between the observed mechanical torque and the electrical torque is calculated therefrom by means of a P/PI/PID regulator C. This is added to the observed mechanical torque, and a setpoint torque, or after multiplication by the current rotational speed a setpoint electrical power, is therefore calculated.

Preferably, the setpoint rotational speed is filtered by a digital filter F, for example a first-order low-pass filter, before calculation of the rotational speed error. This gives rise to a regulator structure with two degrees of freedom, which allows an improvement of the robustness of the regulating loop in relation to modelling inaccuracies of the regulating path for consistently good setpoint value tracking performance or vice versa. The duration of the return of the WPI from the reduced rotational speed to the setpoint rotational speed may be adjusted according to the desired requirements through the selection of a parameter of the filter F. For example, a stabilization time of the regulating loop of 60 s is a preferred selection.

Besides the reduction of the power dip in the recovery phase, the described power observer also allows a further option for the increase of the power after the detection of a frequency dip. In this case, the power may be increased by a fixed value relative to the time-variable "normal" rotational speed-dependent power setpoint value. Here, with the power observer, there is the possibility for this of using the calculated aerodynamic power, rather than as previously a rotational speed-dependent power setpoint value, as a reference for the power increase.

The invention, at least according to one embodiment, has the object of making the conduct of a network support by support after a frequency dip particularly compatible for the energy system, and in particular to keep the reduction of the effective power after the end of the power increase as small as possible. In this way, a further disruption of the energy system power balance is restricted to a minimum amount.

REFERENCES

[1] Asmine, C.-É. Langlois: Field Measurements for the Assessment of Inertial Response for Wind Power Plants based on Hydro-Québec TransÉnergie Requirements. Proceedings of the 13th International Workshop on Large-Scale Integration of Wind Power into Power Systems, Berlin, October 2014.

[2] M. Fischer, S. Engelken, N. Mihov, A. Mendonca: Operational Experiences with inertial Response Provided by Type 4 Wind Turbines. Proceedings of the 13th International Workshop on Large-Scale Integration of Wind Power into Power Systems, Berlin, October 2014.

[3] T. Krüger, J. Geisler, S. Schräder (Repower Systems AG): Dynamic Inertia Regulation. Published international patent application, publication number WO 2011/124696 A2.

[4] C. M. Verrelli, A. Savoia, M. Mengoni, R. Marino, P. Tomei, L. Zarri: On-Line Identification of Winding Resistances and Load Torque in Induction Machines. IEEE Transactions on Control Systems Technology, Vol. 22(4), July 2014.

The invention claimed is:

1. A method for operating a wind power installation, comprising:
   feeding, by a generator, electrical power into an electrical supply network with a first operating state with a first power output and a first rotational speed,
   temporarily increasing the first power output during the first operating state beyond an output power that the wind power installation is able to generate based on prevailing wind conditions, and
   controlling, by a controller, a change to a second operating state with a second power output and a second rotational speed, controlling the change to the second operating state including:
      receiving, by a state observer, a rotational speed of the generator and a mechanical torque of the generator, the rotational speed and the mechanical torque being observed state variables,
      determining, by the state observer, an available aerodynamic power for feeding using the rotational speed of the generator and power fed into an intermediate electrical storage,
      determining a setpoint rotational speed using the available aerodynamic power,
      determining a setpoint power using the setpoint rotational speed, and
      using the setpoint power to adjust the generator.

2. The method according to claim 1, wherein the state observer used for determining the available aerodynamic power is defined by a structure of:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

in which
   J denotes a combined moment of inertia of a rotor and the generator,
   $\omega$ is the rotational speed of the generator,
   $k_\omega$ and $k_T$ are parameters for influencing a dynamic response of the state observer,
   $T_{el}$ is an electrical torque that is determined as a ratio of the power fed into the intermediate electrical storage and the rotational speed ($\omega$), and
   $T_{mech}$ denotes the mechanical torque of the rotor and the generator, wherein the rotational speed of the generator is an actual or observed rotational speed of the generator and the mechanical torque of the rotor is an observed mechanical torque of the rotor.

3. The method according to claim 2, comprising:
   determining, by a regulator, the setpoint power using the available aerodynamic power and the actual rotational speed of the generator.

4. The method according to claim 1, comprising:
   determining the setpoint rotational speed as a function of the aerodynamic available power from a rotational speed and power characteristic curve.

5. The method according to claim 2, comprising:
determining, by a regulator, a difference between the setpoint rotational speed and the actual rotational speed,
determining, by the regulator, a differential torque between the observed mechanical torque and the electrical torque using a regulating algorithm,
determining a setpoint torque as a sum of the differential torque and the observed mechanical torque, and
determining the setpoint power as a product of the setpoint torque and the actual rotational speed.

6. A controller configured to determine an available aerodynamic power of a wind power installation including a generator, wherein the controller is configured to:
control a change from a first operating state in which the generator feeds electrical power into an electrical supply network with a first operating state with a first power output and a first rotational speed, to a second operating state in which the generator feeds electrical power into the electrical supply network with a second power output and a second rotational speed, wherein the first power output during the first operating state is temporarily increased beyond an output power that the wind power installation is able to generate based on prevailing wind conditions, controlling the change to the second operating state including:
observing a rotational speed of the generator and a mechanical torque of the generator as state variables
determining an aerodynamic available aerodynamic power for feeding using the rotational speed of the generator and power fed into an intermediate electrical storage unit,
determining a setpoint rotational speed using the available aerodynamic power,
determining a setpoint power using the setpoint rotational speed, and
using the setpoint power to adjust the generator.

7. The controller according to claim 6, wherein the controller is defined by a structure of:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

in which
J denotes a combined moment of inertia of a rotor of the wind power installation and the generator,
ω is the rotational speed of the generator,
$k_\omega$ and $k_T$ are parameters for influencing a dynamic response of the controller,
$T_{el}$ is an electrical torque and is calculated as a ratio of a power stored in the intermediate electrical storage and the rotational speed ω, and
$T_{mech}$ denotes the mechanical torque of the rotor and the generator, wherein the controller calculates the available power as a product of the observed rotational speed $\hat{\omega}$ and the observed mechanical torque $\hat{T}_{mech}$.

8. A wind power installation comprising:
a generator configured to feed electrical power into an electrical supply network, wherein the wind power installation is configured to operate in a first operating state with a first power output and a first rotational speed, and after the first operating state, the wind power installation is controlled to transition into a second operating state with a second power output and a second rotational speed, wherein the wind power installation is configured to temporarily increase the first power output during the first operating state beyond an output power that the wind power installation is able to generate based on prevailing wind conditions; and
a controller configured to control the transition into the second operating state by:
receiving a rotational speed of the generator and a mechanical torque of the generator, the rotational speed and the mechanical torque being observed state variables,
determining an available aerodynamic power of the wind power installation based on the rotational speed of the generator and power fed into an intermediate electrical storage,
determining a setpoint rotational speed using the available aerodynamic power,
determining a setpoint power using the setpoint rotational speed, and
using the setpoint power to adjust the generator.

9. The wind power installation according to claim 8, wherein the controller is defined by a structure of:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

in which
J denotes a combined moment of inertia of a rotor of the wind power installation and the generator,
ω is the rotational speed of the generator,
$k_\omega$ and $k_T$ are parameters for influencing a dynamic response of the controller,
$T_{el}$ is an electrical torque and is calculated as a ratio of a power stored in the intermediate electrical storage and the rotational speed ω, and
$T_{mech}$ denotes the mechanical torque of the rotor and the generator.

10. The wind power installation according to claim 9, wherein the controller is configured to determine the available power as a product of the observed rotational speed $\hat{\omega}$ and the observed mechanical torque $\hat{T}_{mech}$.

11. The method according to claim 1, wherein the intermediate electrical storage is a DC voltage intermediate circuit.

12. The method according to claim 2, comprising:
determining the available power as a product of the observed rotational speed $\hat{\omega}$ and the observed mechanical torque $\hat{T}_{mech}$.

* * * * *